O. J. BACKUS.
Improvement in Machines for Clarifying, Mixing, and Bleaching Lard.
No. 125,162.  Patented April 2, 1872.
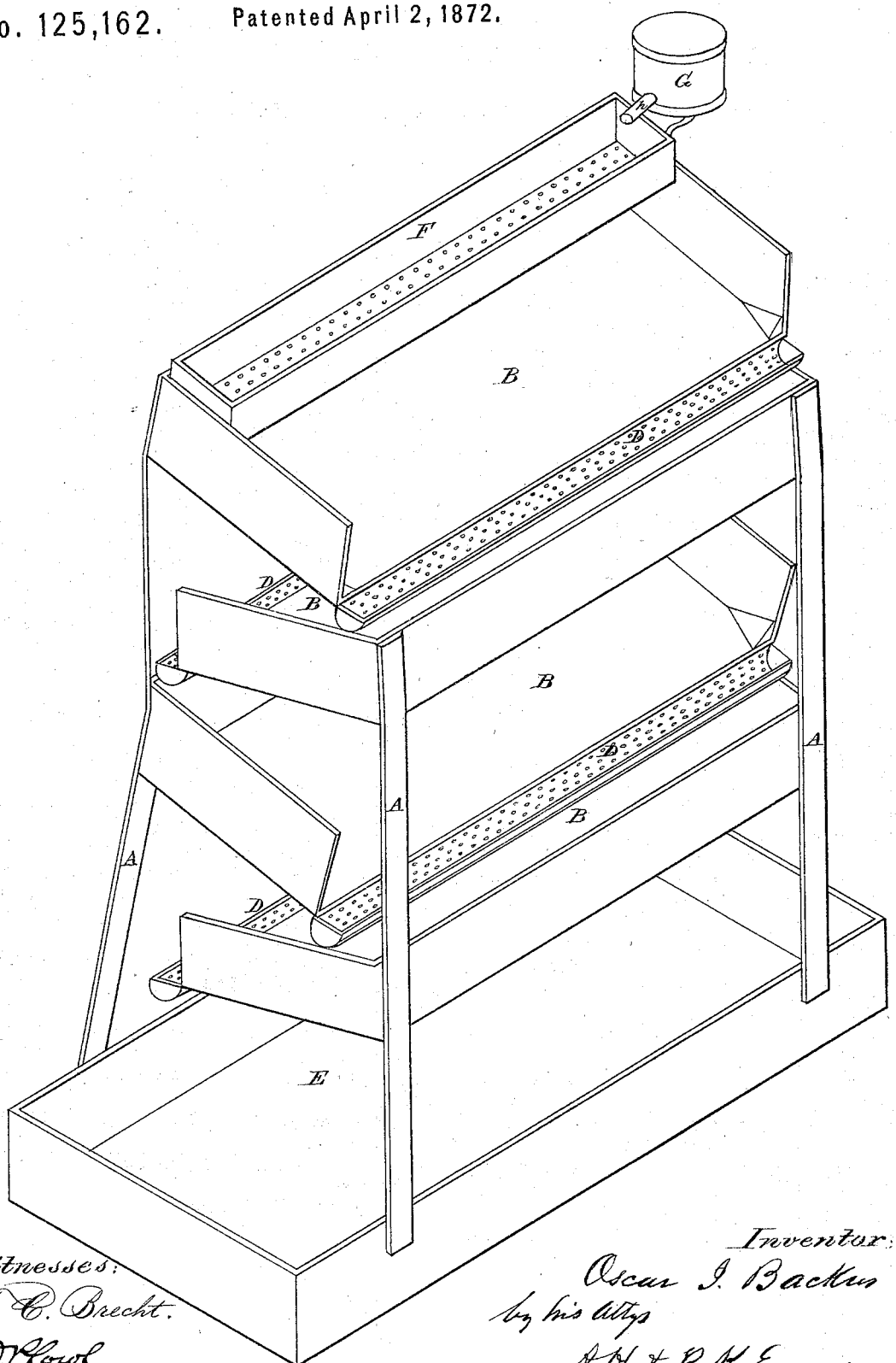
Witnesses:
T. C. Brecht.
D. T. Cowl
Inventor:
Oscar J. Backus
by his Attys
A. H. & R. K. Evans

UNITED STATES PATENT OFFICE.

OSCAR J. BACKUS, OF SAN FRANCISCO, CALIFORNIA.

IMPROVEMENT IN MACHINES FOR CLARIFYING, MIXING, AND BLEACHING LARD.

Specification forming part of Letters Patent No. 125,162, dated April 2, 1872.

SPECIFICATION.

*To all whom it may concern:*

Be it known that I, OSCAR J. BACKUS, of the city and county of San Francisco, State of California, have invented a Machine for Clarifying, Mixing, and Bleaching Lard; and I do hereby declare the following description and accompanying drawing are sufficient to enable any person skilled in the art or science to which it most nearly appertains to make and use my said invention without further invention or experiment.

My invention relates to a machine for treating lard in order to improve its commercial value by clarifying, bleaching, and mixing it in one process so as to render it perfectly white and pure and homogeneous throughout the entire mass; and it consists of a series of oppositely-inclined plain surfaces, combined in one machine and arranged one above another. At the lower side of each inclined surface is placed a strainer or perforated channel which receives the lard and delivers it upon the next lower inclined surface in a finely-divided state, so that the air can act upon every particle and bleach it.

In order to more fully illustrate and explain my invention reference is had to the accompany drawing forming a part of this specification, in which the figure shows a perspective view.

A A represent four standards, which form a frame-work to support two or more inclined metal plates or other plain surfaces, B B B. These plain surfaces are inclined alternately in opposite directions, one above the other, and are so arranged that the lard which flows over the lower side of each one will fall upon the upper side of the one next below. At the lower side of each inclined surface is a perforated channel or strainer, D, through which the lard passes in falling to the next surface below. Below the series of inclined surfaces is a tank or vessel, E, which receives the lard from the last inclined surface. This vessel can be independent of or a part of the machine. Above the upper inclined surface is a trough or vessel, F, which has a perforated bottom. This vessel extends the entire length of the upper surface. A vessel, G, serves to receive the melted lard, from which it flows into the vessel F through a pipe, *h*.

For treating the lard, it is, when thoroughly melted, poured into the vessel G, from which it flows through the pipe *h* into the vessel E. From this vessel it is showered down upon the upper inclined surface, down which it flows in a thin stream into the channel or strainer D, through which it is again showered upon the upper end of the next lower inclined surface, and so on down, showering upon the upper edge and flowing in a thin stream down the inclined surfaces until it falls into the tank E, from which it can be placed into cans.

By this means I subject every particle of the lard to the action of the atmosphere, by which it is clarified and bleached, while the lard will be mixed by the operation and sufficiently cooled before reaching the lower tank to prevent the settling of the stearine to the bottom, as would be the case if it were allowed to stand and cool after being heated.

I do not claim the cooling of lard by subjecting it to the action of the atmosphere while passing from a sieve to a vessel below, as shown in the patent of Volney E. Rusco, November 17, 1863; but

Having thus described my invention, what I claim, and desire to secure by Letters Patent, is—

The series of oppositely-inclined surfaces B B with their strainers or perforated troughs D, substantially as and for the purpose above described.

In witness whereof I have hereunto set my hand and seal.

OSCAR J. BACKUS. [L. S.]

Witnesses:
 HENRY B. BROOKS,
 C. H. WARNER.